United States Patent
Gandhi et al.

(10) Patent No.: US 8,233,592 B2
(45) Date of Patent: Jul. 31, 2012

(54) PERSONAL HOME VOICE PORTAL

(75) Inventors: Shailesh B. Gandhi, Boca Raton, FL (US); Pradeep P. Mansey, Coral Springs, FL (US); Anilkumar B. Patel, West Palm Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1555 days.

(21) Appl. No.: 10/705,328

(22) Filed: Nov. 10, 2003

(65) Prior Publication Data

US 2005/0100142 A1     May 12, 2005

(51) Int. Cl.
*H04M 1/64*     (2006.01)
*H04M 11/00*     (2006.01)

(52) U.S. Cl. ............... 379/88.17; 379/88.01; 379/93.01
(58) Field of Classification Search ............ 379/88.22, 379/93.01
See application file for complete search history.

(56) References Cited

U.S. PATENT DOCUMENTS

| | | | | |
|---|---|---|---|---|
| 5,884,262 A * | 3/1999 | Wise et al. | ............... | 704/270.1 |
| 6,233,318 B1 * | 5/2001 | Picard et al. | ............... | 379/88.17 |
| 6,243,445 B1 * | 6/2001 | Begeja et al. | ............... | 379/93.01 |
| 6,366,650 B1 * | 4/2002 | Rhie et al. | ............... | 379/88.13 |
| 6,400,806 B1 * | 6/2002 | Uppaluru | ............... | 379/88.02 |
| 6,401,085 B1 | 6/2002 | Gershman et al. | | |
| 6,415,021 B1 * | 7/2002 | Oh | ............... | 379/88.13 |
| 6,507,727 B1 | 1/2003 | Henrick | | |
| 6,542,491 B1 | 4/2003 | Tari et al. | | |
| 6,542,497 B1 | 4/2003 | Curry et al. | | |
| 6,625,258 B1 * | 9/2003 | Ram et al. | ............... | 379/88.13 |
| 6,721,705 B2 * | 4/2004 | Kurganov et al. | ............. | 704/270.1 |
| 6,859,451 B1 * | 2/2005 | Pasternack et al. | ............. | 370/352 |
| 6,970,915 B1 * | 11/2005 | Partovi et al. | ................. | 709/217 |
| 7,016,348 B2 * | 3/2006 | Laursen et al. | ................. | 370/389 |
| 7,076,431 B2 * | 7/2006 | Kurganov et al. | ............... | 704/275 |
| 7,386,455 B2 * | 6/2008 | Kurganov et al. | ............. | 704/270.1 |
| 7,672,440 B2 * | 3/2010 | Chen et al. | ................ | 379/209.01 |

(Continued)

FOREIGN PATENT DOCUMENTS

CN     1286561     3/2001

(Continued)

OTHER PUBLICATIONS

Tsunemasa Mizuo, "Validating Technology, Practicality of Speech Recognition (Sequel), Spotlighted Voice Portal, Which is Urgently in Need of Establishing it's Business Model" Computer Telephony, RIC TELECOM, vol. 4, No. 3, pp. 38-41.

*Primary Examiner* — Joseph T Phan
(74) *Attorney, Agent, or Firm* — Wolf, Greenfield & Sacks, P.C.

(57) ABSTRACT

A method of accessing voice services through a personal computing system can include receiving, in the personal computing system, a telephone call from a user registered with the personal computing system, wherein the user is remotely located from the personal computing system, receiving a user spoken utterance over the telephone call, and speech recognizing the user spoken utterance to determine a request for a voice service. The method further can include formatting an electronic message according to the request for a voice service and sending the electronic message over a communications network to a remote computing system in accordance with the request for a voice service. Also, the method can include processing and formatting a response received from the remote computing system and playing back audio to the user over the telephone call.

18 Claims, 2 Drawing Sheets

U.S. PATENT DOCUMENTS

| | | | | |
|---|---|---|---|---|
| 7,787,867 | B2* | 8/2010 | Berger et al. | 455/413 |
| 7,881,941 | B2* | 2/2011 | Kurganov et al. | 704/275 |
| 7,976,386 | B2* | 7/2011 | Tran | 463/36 |
| 2001/0023400 | A1* | 9/2001 | Kurganov et al. | 704/270.1 |
| 2001/0047262 | A1* | 11/2001 | Kurganov et al. | 704/270.1 |
| 2002/0169615 | A1* | 11/2002 | Kruger et al. | 704/270.1 |
| 2003/0152203 | A1* | 8/2003 | Berger et al. | 379/93.24 |
| 2004/0088358 | A1* | 5/2004 | Boda et al. | 709/206 |
| 2004/0117838 | A1* | 6/2004 | Karaoguz et al. | 725/86 |
| 2004/0193427 | A1* | 9/2004 | Kurganov et al. | 704/275 |
| 2006/0159067 | A1* | 7/2006 | Chen et al. | 370/352 |
| 2006/0166650 | A1* | 7/2006 | Berger et al. | 455/412.1 |
| 2006/0190265 | A1* | 8/2006 | Kurganov et al. | 704/270.1 |
| 2006/0218191 | A1* | 9/2006 | Gopalakrishnan | 707/104.1 |
| 2006/0248059 | A1* | 11/2006 | Chi et al. | 707/3 |
| 2007/0298885 | A1* | 12/2007 | Tran | 463/37 |
| 2008/0189113 | A1* | 8/2008 | Kurganov et al. | 704/270.1 |
| 2008/0214253 | A1* | 9/2008 | Gillo et al. | 463/1 |
| 2008/0215971 | A1* | 9/2008 | Gillo et al. | 715/706 |
| 2008/0292065 | A1* | 11/2008 | Chen et al. | 379/46 |
| 2008/0318679 | A1* | 12/2008 | Tran et al. | 463/39 |
| 2011/0091023 | A1* | 4/2011 | Kurganov et al. | 379/88.17 |

FOREIGN PATENT DOCUMENTS

| | | |
|---|---|---|
| CN | 1531312 | 9/2004 |
| JP | 10-190884 | 7/1998 |
| JP | 10-229426 | 8/1998 |
| JP | 1997-538046 | 9/1999 |
| JP | 2001-216211 | 8/2001 |
| JP | 2002-033832 | 1/2002 |
| JP | 2003-167895 | 6/2003 |
| JP | 2003-309673 | 10/2003 |

* cited by examiner

PERSONAL HOME VOICE PORTAL

BACKGROUND

1. Field of the Invention

The invention relates to the field of voice services and, more particularly, to providing access to network-based information services through a personal computer system.

2. Description of the Related Art

A portal is a Web site that serves as an entry point for accessing information. A portal effectively provides a central network location through which users can access information such as news, weather reports, stock quotes, electronic mail, and the like. Typically, the content provided through a portal and the manner in which the content is provided can be customized by the user. Accordingly, each user is able to access and view personalized information as well as various services through the portal in a user-specific manner.

The primary mechanism for accessing portals has been through Web-enabled devices. Specifically, users have accessed portals via home computer systems having suitable Internet connections. So long as the user has access to such a computer system, the user can obtain information and other services from the portal.

When away from the computer system, the user still may access a portal, albeit through some sort of wireless, Internet-enabled device. Traditionally, cellular telephones, for example those configured to communicate using Wireless Access Protocol (WAP), have provided users with access to portals. Despite the mobility afforded by cellular telephones, users are restricted to accessing information and services through small visual displays incorporated within the cellular telephone.

In any case, to access information from a Web portal, users have been restricted to using devices having Internet connections. Moreover, users typically must subscribe to a fee service to access personalized information when mobile.

SUMMARY OF THE INVENTION

The present invention provides a method, system, and apparatus for accessing Web content using voice commands through a telephony connection. In particular, the present invention allows a user to call a home computer system and request information or services over the established call. The home computer system can obtain the requested information or perform the user requested service. As such, the user can access information and content on the Internet, for example from a Web portal, through the user's own computer system. By allowing access to Web portals and other services such as electronic mail and instant messaging through a telephone, the need to subscribe to additional wireless and other paid services can be eliminated, or at least minimized.

One aspect of the present invention can include a method of accessing voice services through a personal computing system. The method can include receiving, in the personal computing system, a telephone call from a user registered with the personal computing system, wherein the user is remotely located from the personal computing system, receiving a user spoken utterance over the telephone call, and speech recognizing the user spoken utterance to determine a request for a voice service. The method also can include formatting an electronic message according to the request for a voice service and sending the electronic message over a communications network to a remote computing system in accordance with the request for a voice service.

In one embodiment of the present invention, the request can be a request for content from a remote computing system. In that case, the formatting step can include building an electronic message to be sent over the Internet. The method also can include receiving content in the personal computing system from the remote computing system, converting the content to speech audio in the personal computing system, and playing the audio to the user over the telephone call.

In another embodiment of the present invention, the request can be a request to send an electronic mail. Accordingly, the method can include receiving at least one additional user spoken utterance and converting the additional user spoken utterance to text. Notably, the formatting step can build an electronic mail to be sent in the sending step. The speech recognized text can be included within the electronic mail.

In yet another embodiment, the request can be a request to send an instant message. Accordingly, the method can include receiving at least one additional user spoken utterance and converting the additional user spoken utterance to text. In that case, the formatting step can include building an instant message to be sent in the sending step. The instant message can include the speech recognized text.

Another aspect of the present invention can include a system for accessing voice services through a personal computing system. The system can include an interface for receiving telephone calls within the personal computing system and a speech recognition system disposed within the personal computing system for converting user utterances received over established telephone calls to text. The system also can include a service engine configured to receive speech recognized text from the speech recognition system, identify user requests from the text, generate messages according to the user requests, and send the messages to at least one remote computing system via a communications network.

In another embodiment of the present invention, the system can include a text-to-speech engine disposed within the personal computing system for converting received text to speech to be played over established telephone calls. The service engine can receive content responsive to the sent messages and provide the content to the text-to-speech engine to be rendered as speech.

According to another embodiment of the present invention, the service engine can include an electronic mail interface configured to generate messages, for example electronic mail messages, according to user requests. The service engine also can include an instant messaging interface configured to generate messages according to user requests, wherein the messages are instant messages. Still, the service engine can include a Hypertext Transfer Protocol interface configured to format user requests for transmission over the Internet.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
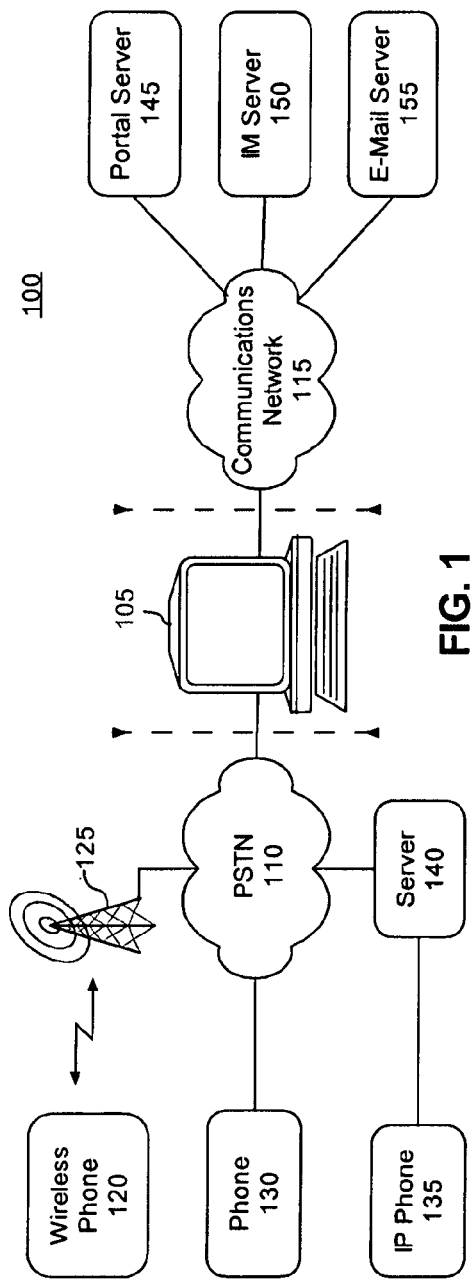
FIG. 1 is a schematic diagram illustrating a system for accessing Internet-based content via a telephony connection through a personal computing system in accordance with the inventive arrangements disclosed herein.

FIG. 1 is a schematic diagram illustrating a system 100 for accessing Internet-based content via a telephony connection through a personal computing system in accordance with the inventive arrangements disclosed herein. As shown, system 100 can include one or more phones communicatively linked with a personal computing system 105 via a network such as the Public Switched Telephone Network (PSTN) 110. The personal computing system 105 is communicatively linked with one or more servers via the communications network 115.

Wireless phone 120 can be a cellular telephone or other wireless communications device that can be communicatively linked to the PSTN 110 through a relay station or tower 125. Phone 130 can be a conventional landline telephone that can be communicatively linked to the PSTN 110 via a central office or other telephony switching system. The phone 130 can include any telephone that is remotely located from the computing system 105, including but not limited to public telephones. Internet Protocol (IP) phone 135 can be communicatively linked to the PSTN 110 via a server 140 or other gateway mechanism capable of interfacing an IP-based communications network with the PSTN 110.

It should be appreciated that the examples disclosed herein have been provided for purposes of illustration only. As such, the present invention is not limited by the particular type of communications device used. Rather, the present invention can be practiced with any of a variety of communications devices that can send and receive voice signals and/or dual tone multi-frequency (DTMF) signals over the PSTN.

The personal computing system 105 can be any of a variety of computing and/or information processing devices capable of connecting to the PSTN 110 and a communications network 115 such as the Internet, the World Wide Web (Web), a Local Area Network (LAN), a Wide Area Network (WAN), or the like. For example, the personal computing system 105 can be implemented as a conventional, home desktop computer having a modem, a portable computer such as a laptop, also having a modem, or some other information processing appliance configured to function as described herein.

The personal computing system 105 can include a personal home voice portal (not shown) which allows a user to call the personal computing system 105 from a remote location using a telephony device as described herein. The personal home voice portal (PHVP) can receive user spoken commands, dictation, and DTMF signals causing the personal computing system 105 to initiate some sort of action. For example, the PHVP allows a user to access information and/or services from a portal server 145, send and receive instant messages (IM's) via IM server 150, and send and receive electronic mail (e-mail) via e-mail server 155. The PHVP can include text-to-speech and speech recognition functionality such that the user can perform the aforementioned functions through speech commands, dictation, DTMF signaling, or any combination thereof.

The personal computing system 105 can be communicatively linked to one or more servers such as the portal server 145, the IM server 150, and the e-mail server 155 through the communications network 115. While the IM server 150 and the e-mail server 155 can be dedicated to a particular use, the portal server 145 can provide an assortment of services such as e-mail, news, financial information such as stock quotes, and other services such as list serves and groups. The portal server 145 can be customized for use by each user. That is, a user can configure the portal server 145 to provide only those services that are desired by the user. Typically, a user is able to register with the portal server 145. The user then can personalize one or more Web pages on the portal sever 145 which can be accessed with the appropriate username, password, and/or other authentication mechanism. Each Web page can include content selected by the user. Still, it should be appreciated that the personal computing system 105 can be communicatively linked to one or more other Web-based servers, whether subscription based or freely accessible.

In operation, a user can initiate a telephone call from the wireless phone 120, the phone 130, and/or the IP phone 135. The call can be directed to the user's own personal computing system 105, for example one located within the user's home. The user, after logging on to the personal computing system 105 and being authenticated, can issue one or more voice commands. The user can request information from the portal server 145, send an e-mail, check for received-e-mails, send IM's, and receive IM's.

For example, the user can issue a verbal request to send an e-mail. The user can specify the name of a user or an e-mail address to which the e-mail is to be sent. The user can proceed to dictate the body of the e-mail and then command the PHVP to send the e-mail. The PHVP can include, or interact with, an e-mail client which can forward the e-mail to the e-mail server 155.

In another example, the user can request one or more stock quotes over the telephone line. The PHVP can log into the portal server 145 on behalf of the user. The user request can be speech recognized and converted to text by the PHVP, formatted as a hypertext transfer protocol (HTTP) request, and forwarded to the portal server 145. The PHVP can receive the requested content and convert the content to speech to be played to the user over the telephone call.

The inventive arrangements disclosed herein provide a calling user with access to personalized services, whether by accessing services for which the user has registered on a remote server such as portal server 145, by accessing an address book or other information stored on the personal computing system 105, or by accessing e-mail or instant messaging on the personal computing system 105, the IM server 150, and the e-mail server 155. Further, while the personal computer system 105 can answer calls from the telephony devices illustrated in FIG. 1, those skilled in the art will recognize that the personal computing system 105 does not function as a conventional server. In particular, the personal computing system 105 does not exercise administrative control over a plurality of clients. That is, the personal computing system 105 functions as a client with respect to accessing the portal server 145, the IM server 150, and the e-mail server 155. The various telephony devices that call into the personal computing system 105 cannot be administered or controlled through the personal computing system 105.

Figure 2:
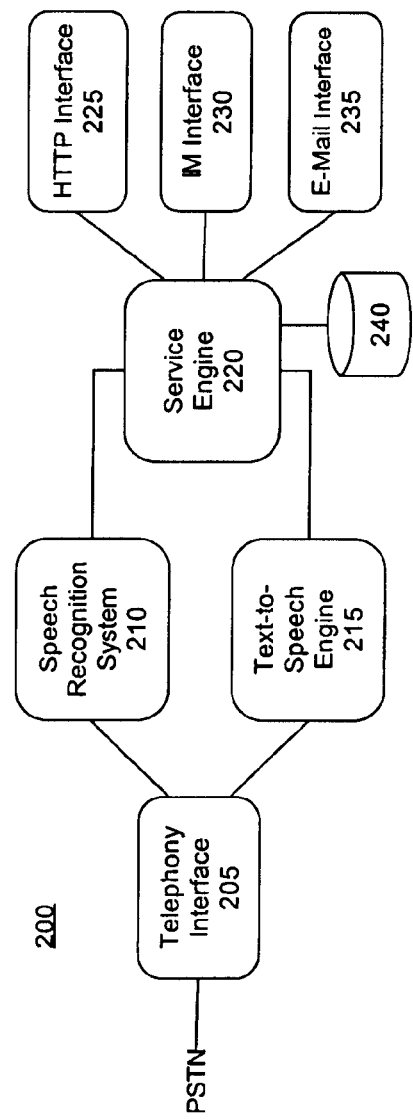
FIG. 2 is a schematic diagram illustrating one embodiment a personal home voice portal in accordance with the inventive arrangements disclosed herein.

FIG. 2 is a schematic diagram illustrating one embodiment of a PHVP 200 in accordance with the inventive arrangements disclosed herein. The PHVP 200 can include a telephony interface 205 such as a modem, a speech recognition system (SRS) 210, a text-to-speech (TTS) engine 215, and a service engine 220. In one embodiment of the present invention, the PHVP 200 can include an HTTP interface 225, an IM interface 230, and an e-mail interface 235. Alternatively, the PHVP 200 can be configured to interact with other software applications configured to provide such functionality. For example, the PHVP 200 can be configured to interact with a browser, an IM client, and/or an e-mail client.

The telephony interface 205 can receive incoming telephone calls from the PSTN. The telephony interface 205 also can perform analog-to-digital and digital-to-analog conversions of audio, whether speech and/or DTMF signals, exchanged between the PSTN and the PHVP 200. The SRS 210, as is known in the art, can convert received audio to textual equivalents. In one embodiment of the present invention, the SRS 210 can perform speaker-independent speech recognition and/or device dependent speech recognition. That is, the user can create an enrollment with the SRS 210 as well as one or more enrollments for each telephony device the user wishes to use with the PHVP 200. The enrollment process increases speech recognition accuracy as the SRS 210 learns the manner in which the user speaks and the audio characteristics of the telephony device used. In another embodiment, however, the SRS 210 can perform speaker-dependent and/or device independent speech recognition. The TTS engine 215 can receive text and produce an audio output. That is, the TTS engine 215 can generate speech or spoken equivalents of received text.

The HTTP interface 225 provides functionality for interacting with Web pages and/or portals. The HTTP interface 225 can format requests to be sent over a communications network and decode information received in response to a request. It should be appreciated that any of a variety of different types of requests can be formatted and decoded through the HTTP interface 225. For example, the HTTP interface 225 can process requests and responses conforming to File Transfer Protocol (FTP), Lightweight Directory Access Protocol (LDAP), HTTP, and other types of communication protocols which can be used to communicate over a communications network.

The IM interface 230 can format messages as IM's for sending over a communications network as well as receive and decode IM's for use by the service engine 220. Similarly, the e-mail interface 235 can format e-mails for sending over a communications network and receive and decode e-mails for use by the service engine 220.

The service engine 220 can coordinate the actions of the various components of the PHVP 200. In particular, the service engine 220 can receive speech recognized text from the SRS 210 and process the text to determine one or more user desired functions or operations. The service engine 220 further can provide text to the TTS engine 215 to be rendered as audio. For example, the service engine 220 can route content received via the HTTP interface 235, the IM interface 230, and the e-mail interface 235 to the TTS engine 215 for playback as speech. Accordingly, the audio can be played to the user over an established telephone call via the telephony interface 205.

The service engine 220 can format the text of IM's, electronic mails, or other Web content such as Web pages for playback through the TTS engine 215. For example, the service engine 220 can remove markup language tagging or other extraneous annotations not needed or understood by the TTS engine 215 as well as add annotations that can be understood by the TTS engine 215. In one embodiment, the service engine 220 can include rules for removing markup language, symbols, and/or text that may be used by the HTTP interface 225, the IM interface 230, and/or the e-mail interface 235. The service engine 215 also can annotate text that is being provided to the TTS engine 215 to control the manner in which the text is to be read or played to the user. For example, the service engine 215 can annotate the text to add pauses between data fields, stock quotes, or other items in a list. Pauses also can be added between the subject and body portions of an e-mail, as the case may. The insertion of pauses can facilitate a smooth and logical playback of content, whether from a Web page, an IM, or an e-mail.

The service engine 220 also can determine the particular action or service being requested by the user. If no further information is required to perform the user specified action, the service engine 220 can instruct the HTTP interface 225, the IM interface 230, and/or the e-mail interface 235 to perform the user-specified action. If necessary, the service engine 220 can cause the TTS engine 215 to prompt the user for additional required information and/or dictation. Any user responses, whether speech or DTMF input, can be processed by the SRS 210 and provided to the service engine 220 for processing. Information received by the service engine 220, whether content from the HTTP interface 225, received IM's from the IM interface 230, and/or received e-mails from the e-mail interface 235 can be provided to the TTS engine 215 for playback to the user over the telephone call.

The PVHP 200 can include a data store 240 having one or more user profiles. Each user profile can specify associations of user requests and corresponding actions. For example, user requests for stock quotes can be associated with a particular Web portal with which the user has registered for an account. When a user request for a stock quote is received and matched with the stock quote request stored in the user's profile, the action associated with the matched request in the user profile can be performed. Continuing with the illustration, the information source specified in the user profile that is associated with stock quote request can be accessed or queried for the user specified information. Notably, the user profile further can include any usernames and/or passwords that may be necessary for the service engine 220 to log on to a Web portal or other subscription service on behalf of the user.

Similar associations can be stored in the profile for requests to send e-mails, instant messages, and the like. By comparing the speech recognized text of the user request with requests specified in the user profile, the service engine 220 can communicate with the HTTP interface 225 to send requests and receive electronic content, the IM interface 230 to send and receive IM's, and the e-mail interface 235 to send and receive e-mails.

Figure 3:
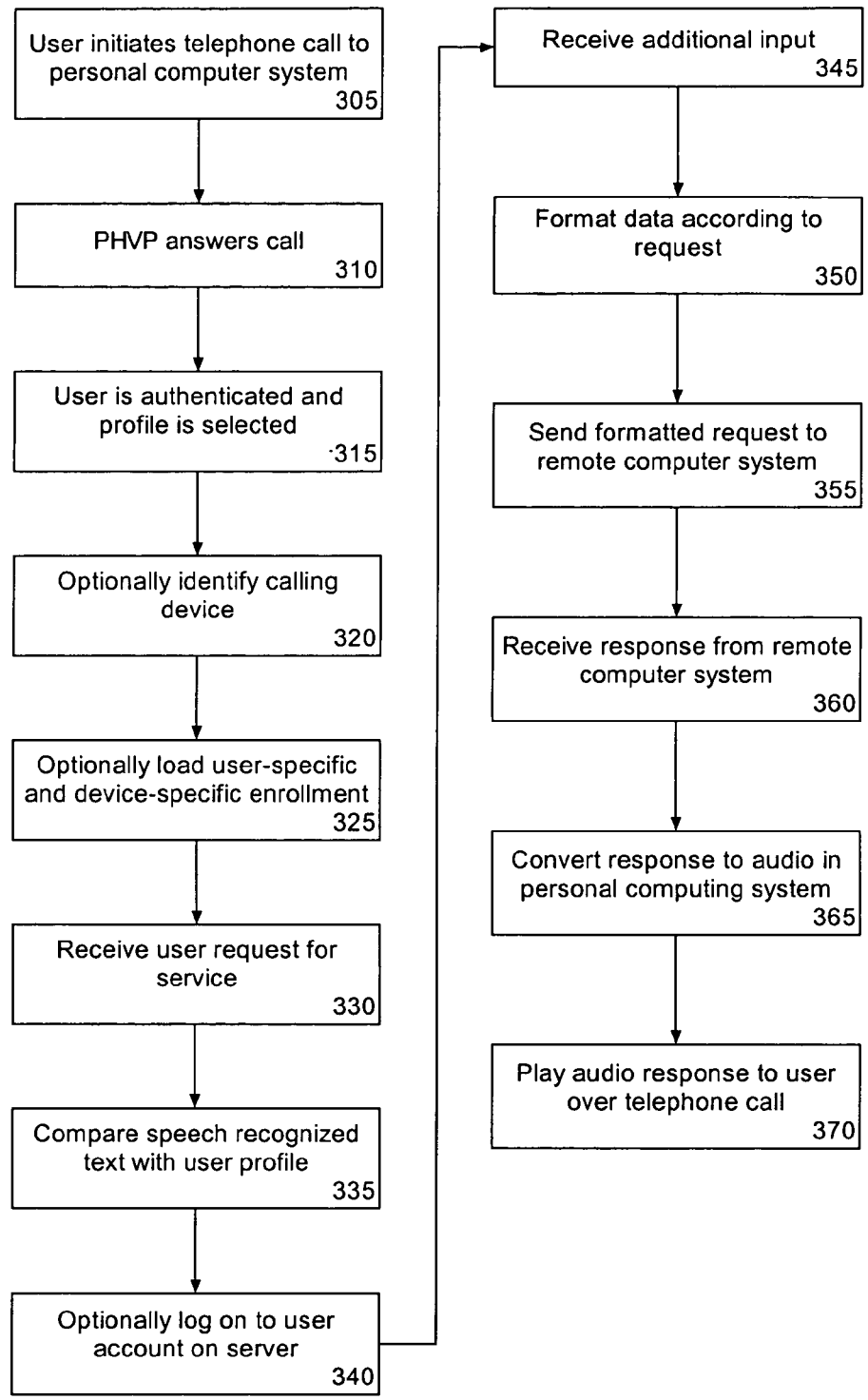
FIG. 3 is a flow chart illustrating a method of accessing information and/or services from network locations via a telephony connection and a home computing system in accordance with the inventive arrangements disclosed herein.

FIG. 3 is a flow chart illustrating a method 300 of accessing information and/or services from network locations via a telephony connection and home computing system in accordance with one embodiment of the inventive arrangements disclosed herein. The method 300 can begin in a state where a user is remotely located from his or her own personal computer system, but has telephony access. Accordingly, in step 305, the user can initiate a telephone call to the user's personal computing system. For example, the user can dial the user's home telephone number.

In step 310, the PHVP can answer the received telephone call. For example, the PHVP, operating within the users personal computing system, can be configured to answer telephone calls received in the home or answer a particular line. In step 315, once the PHVP has answered the telephone call, the user or caller can be authenticated by the PHVP system. The user can provide a username and/or password, whether in the form of user speech and/or DTMF signals. In another embodiment of the present invention, biometric methods of authentication can be performed. For example, voice print technology can be used to authenticate the user. In any case, once the user is identified, a profile for the user can be selected.

In step 320, the PHVP optionally can identify the device used by the user to initiate the call. The PHVP can provide audio prompts, if necessary, or simply recognize user speech or DTMF signals indicating the type of device used to initiate the call. For example, since the PHVP operates in the user's personal computing system, the user can make multiple enrollments with the SRS. Each enrollment can pertain to a specific telephony or voice communications device. In illustration, the user can enroll using a cellular telephone, an IP phone, or any other device with which the user may choose to initiate a telephone call. Each enrollment stores the audio channel characteristics of the device used to make the enrollment as well as the user's speech characteristics. By selecting an enrollment corresponding with the device being used for a call, increased accuracy of speech recognition can be achieved.

In one embodiment of the present invention, the user can select a particular profile after being identified to the PHVP. Each profile can specify a particular enrollment, and therefore telephony device, to be used for the duration of the call. Each profile further can specify different sources of information to be used for given tasks. For example, one profile for a user can specify that stock quotes are to be accessed from a "paid for" service and that e-mail is to be accessed from a first e-mail account. A second user profile for the same user can specify that stock quotes are to be obtained from a free Web portal and that a different e-mail account is to be checked. This enables the user to have, for example, a business profile and a personal profile, each accessing different sources of information and designed for use with different types of telephony equipment.

Having identified both the user and the particular device being used to initiate the telephone call, an enrollment for the caller can be loaded in step 325. As noted, the selected enrollment can correspond not only with the user, but also can correspond with the type of telephony device being used by the caller for the duration of the call. While the method 300 illustrates an embodiment where speaker and device dependent speech recognition is performed, those skilled in the art will recognize that the present invention is not so limited. Rather, speaker-independent and/or device-independent speech recognition also can be used.

In step 330, the PHVP can receive a user request for a service over the established telephone call. The request for service can be a request for content from a Web site, a portal, or other remote information source, a request to check e-mail, send or compose e-mail, check for received IM's, compose IM's, send IM's, or the like. In step 335, the speech recognized text of the user request can be compared with the selected user profile. The text can be matched with a particular request specified in the user profile. The action associated with the matched request can then be implemented.

In step 340, the PHVP can log on to a server with which the user has been registered as specified by the action associated with the matched user profile request, whether a portal server, an IM server, or an e-mail server. For example, if the user has requested stock quote information, and if specified in the user profile, the PHVP can log on to the user's portal account to download personalized information, in this case stock information such as quotes from a personalized portfolio being maintained online. If the user has asked to compose or access e-mail, the PHVP can log on to the user's e-mail account on a remote server. If the user has requested more generalized information that can be obtained from a data source that does not require a subscription, the PHVP need not log on to a server to obtain the information, but rather query a general information service.

In step 345, if necessary, the PHVP can query the user for any additional information needed by the system to perform and/or complete the user-specified task. For example, the additional information can include one or more addresses to which a message is to be sent, dictation to be inserted within the body portion of an electronic communication, or the like. Those skilled in the art will recognize that the PHVP can be configured to carry on a dialog with the user to obtain any needed information.

In step 350, the received data, as well as any data determined or accessed by the PHVP, for example from the user profile, can be formatted according to the received user request. For instance, if the user request was to compose and/or send an e-mail, the received dictation and any specified e-mail addresses can be inserted into an e-mail message. Similarly, speech recognized text can be inserted into an IM or be incorporated into an HTTP request.

In step 355, the formatted data can be forwarded to a remote computer system. Thus, for example, a formatted e-mail can be sent, a formatted IM can be sent, an HTTP request can be sent, or a request to download new e-mail can be sent. It should be appreciated that if the message sent in step 355 is one which invokes a response, then the response can be processed by the service engine and provided to the TTS engine for playback to the user. In illustration, content received responsive to an HTTP request can be played back to the user. Retrieved e-mails or received IM's also can be played back to the user.

In any case, in step 360, a response from the remote computer system can be received in the PHVP in the user's personal computing system. The response can be an indication as to whether the user requested operation was successfully performed or can be information that was requested by the user, and therefore the PHVP. For example, the PHVP can receive an indication that an e-mail or an IM was successfully sent. If the user requested financial information, that information can be received.

In step 365, the response can be processed or converted into audio by the PVHP. The received message can be parsed to extract text. For example, extraneous information such as tags or header information can be removed so that only content is extracted from the received message. Additionally, the prosodic characteristics of the content can be altered to make the resulting audio sound more natural. For example, the text can be annotated to insert pauses between tab or comma delineated data, columns, and the like. Other prosodic characteristics such as syllable stress can be altered as well. The resulting content can be provided to the TTS engine of the PHVP to be rendered as audio. In step 370, the resulting audio can be played by the PHVP to the user over the established telephone call.

The present invention provides a personalized voice portal that enables a user to access various Web content and Internet-based subscription services using a personal computing system and a telephony device. By calling the user's own personal computing system, the user can access personalized and customized data, for example from a Web portal, via phone. Accordingly, the user listen to an audible rendition of the requested data over a telephone call without having to subscribe to additional fee-based, mobile information services.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for remotely requesting information and/or services from at least one remote service server through a home personal computer, the method comprising steps of:
receiving, at the home personal computer, a telephone call from a user that is registered with the home personal computer, wherein the telephone call is a call originating from a device remote from the home personal computer, wherein the home personal computer is directly connected to the user's subscriber line;
receiving a user spoken utterance over the telephone call;
performing speech recognition on the user spoken utterance to determine a request for information and/or a service;
formatting an electronic message according to the request;
sending the electronic message over a communication network from the home personal computer to the at least one remote service server;
receiving content at the home personal computer from the at least one remote service server;
converting the content to speech audio at the home personal computer; and
playing the speech audio to the user over the telephone call.

2. The method of claim 1, wherein said formatting step comprises building an electronic message to be sent over the Internet.

3. The method of claim 1, wherein the request comprises a request to send an electronic mail, said method further comprising:
receiving at least one additional user spoken utterance; and
converting the at least one additional user spoken utterance to speech-recognized text, wherein said formatting step builds an electronic mail to be sent from the home personal computer to the at least one remote service server and includes the speech-recognized text in the electronic mail.

4. The method of claim 1, wherein the request comprises a request to send an instant message, said method further comprising:
receiving at least one additional user spoken utterance; and
converting the at least one additional user spoken utterance to speech-recognized text, wherein said formatting step builds an instant message to be sent from the home personal computer to the at least one remote service server and includes the speech-recognized text in the instant message.

5. The method of claim 1, wherein the home personal computer is in the user's home.

6. The method of claim 1, wherein the home personal computer is owned by the user.

7. The method of claim 1, wherein the home personal computer comprises a portable computer.

8. The method of claim 1, wherein the user pays no fee to an owner of the home personal computer for access to the home personal computer.

9. An article of manufacture comprising at least one computer readable medium encoded with instructions that, when executed by at least one computer, perform a method for remotely requesting information and/or services from at least one remote service server through a home personal computer, the method comprising:
receiving, at the home personal computer, a telephone call from a user that is registered with the home personal computer, wherein the telephone call is a call originating from a device remote from the home personal computer, wherein the home personal computer is directly connected to the user's subscriber line;
receiving a user spoken utterance over the telephone call;
performing speech recognition on the user spoken utterance to determine a request for information and/or a service;
formatting an electronic message according to the request;
sending the electronic message over a communication network from the home personal computer to the at least one remote service server;
receiving content at the home personal computer from the at least one remote service server;
converting the content to speech audio at the home personal computer; and
playing the speech audio to the user over the telephone call.

10. The article of manufacture of claim 9, wherein the home personal computer is in the user's home.

11. The article of manufacture of claim 9, wherein the home personal computer is owned by the user.

12. The article of manufacture of claim 9, wherein the home personal computer comprises a portable computer.

13. The article of manufacture of claim 9, wherein the user pays no fee to an owner of the home personal computer for access to the home personal computer.

14. A home personal computer programmed to request information and/or services from at least one remote service server on behalf of a user that is registered with the home personal computer, the home personal computer comprising:
a telephone connection to receive a telephone call from the user at the home personal computer, wherein the telephone call is a call originating from a device remote from the home personal computer, wherein the telephone connection is capable of receiving a user spoken utterance over the telephone call, wherein the home personal computer is directly connected to the user's subscriber line;
a speech recognizer to recognize the user spoken utterance to determine a request for information and/or a service;
at least one interface to format an electronic message according to the request;
a network connection to send the electronic message from the home personal computer over the communication network to the at least one remote service server and to receive content from the at least one remote service server at the home personal computer; and
a text-to-speech synthesizer to convert the content to speech audio and play the speech audio to the user over the telephone call.

15. The home personal computer of claim 14, wherein the home personal computer comprises a portable computer.

16. The method of claim 1, wherein the telephone call from the user is received at the user's home telephone number.

17. The article of manufacture of claim 9, wherein the telephone call from the user is received at the user's home telephone number.

18. The home personal computer of claim 14, wherein the telephone connection receives the telephone call from the user at the user's home telephone number.

* * * * *